US009204372B2

(12) United States Patent
Ahn et al.

(10) Patent No.: US 9,204,372 B2
(45) Date of Patent: Dec. 1, 2015

(54) METHOD OF TRANSMISSION AND RECEPTION FOR DEVICE TO DEVICE DISCOVERY AND APPARATUS THEREOF

(71) Applicant: Electronics and Telecommunications Research Institute, Daejeon (KR)

(72) Inventors: Jae Young Ahn, Daejeon (KR); Young Jo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/081,506

(22) Filed: Nov. 15, 2013

(65) Prior Publication Data

US 2014/0301285 A1    Oct. 9, 2014

(30) Foreign Application Priority Data

Nov. 16, 2012  (KR) .................. 10-2012-0130437
Jan. 15, 2013  (KR) .................. 10-2013-0004624
Nov. 15, 2013  (KR) .................. 10-2013-0139422

(51) Int. Cl.
*H04W 4/00* (2009.01)
*H04W 48/12* (2009.01)
*H04W 8/00* (2009.01)
*H04W 76/02* (2009.01)

(52) U.S. Cl.
CPC .............. *H04W 48/12* (2013.01); *H04W 8/005* (2013.01); *H04W 76/023* (2013.01)

(58) Field of Classification Search
None
See application file for complete search history.

(56) References Cited

U.S. PATENT DOCUMENTS

| 2012/0163235 | A1  | 6/2012  | Ho et al.           |         |
|--------------|-----|---------|---------------------|---------|
| 2013/0148643 | A1* | 6/2013  | Abraham et al. .............| 370/338 |
| 2013/0227152 | A1* | 8/2013  | Lee et al. ...................... | 709/227 |
| 2013/0315141 | A1* | 11/2013 | Homchaudhuri et al. .... | 370/328 |
| 2014/0056248 | A1* | 2/2014  | Wang et al. ................... | 370/329 |
| 2014/0092885 | A1* | 4/2014  | Venkatachalam et al. .... | 370/338 |
| 2014/0171062 | A1* | 6/2014  | Fallgren et al. ............. | 455/422.1 |
| 2015/0003327 | A1* | 1/2015  | Seok et al. ................... | 370/328 |
| 2015/0071189 | A1* | 3/2015  | Park et al. ..................... | 370/329 |
| 2015/0087233 | A1* | 3/2015  | Kim et al. .................... | 455/41.2 |

* cited by examiner

*Primary Examiner* — Chi H Pham
*Assistant Examiner* — Soon-Dong D Hyun
(74) *Attorney, Agent, or Firm* — Nelson Mullins Riley & Scarborough LLP

(57) ABSTRACT

Methods of discovery performed in a terminal are disclosed. A method of discovery, performed in a terminal, may comprise selecting a discovery physical channel on which discovery information is transmitted in a discovery frame comprising a plurality of transmission durations, and transmitting the discovery information through the selected discovery physical channel. Thus, efficient discovery between terminals may be performed and efficiency of resource usage can be enhanced.

8 Claims, 7 Drawing Sheets

→ D2D LINK
←---→ CELLULAR LINK (CONTROL/DATA)

▦ RADIO RESOURCES FOR DISCOVERY PROCESS (#0)
▦ RADIO RESOURCES FOR DISCOVERY PROCESS (#1)
▨ RADIO RESOURCES FOR DISCOVERY PROCESS (#2)
▨ RADIO RESOURCES FOR DISCOVERY PROCESS (#3)

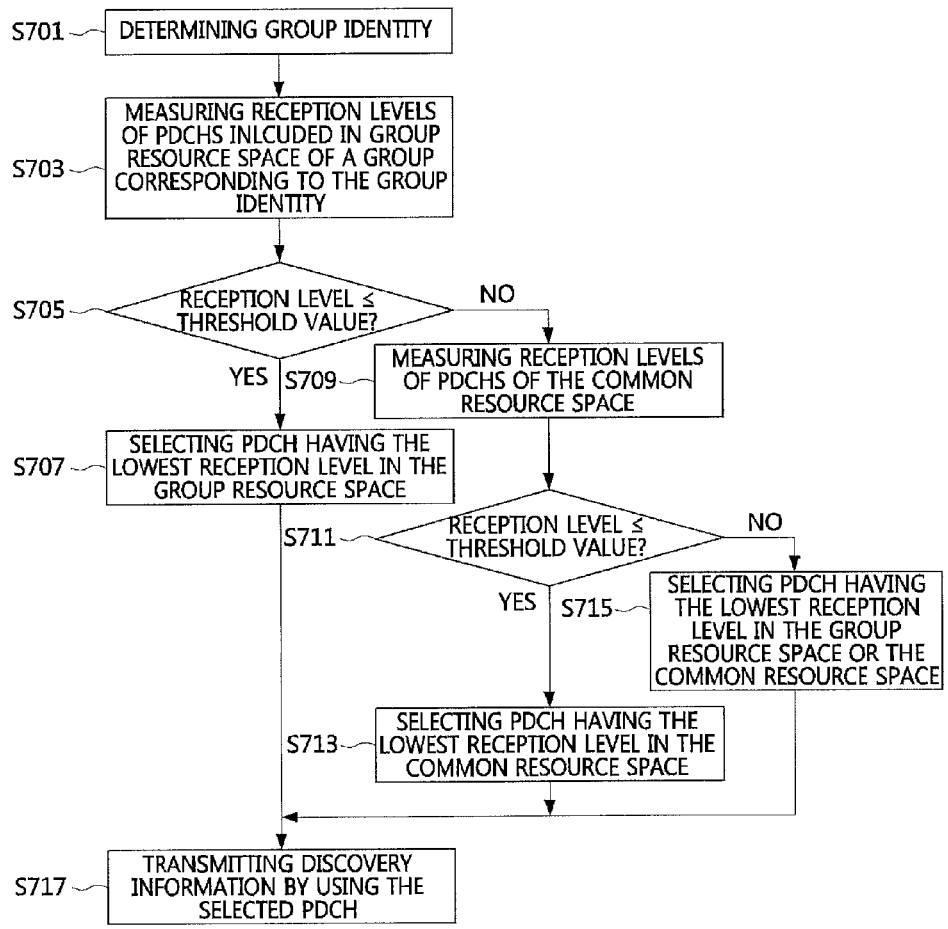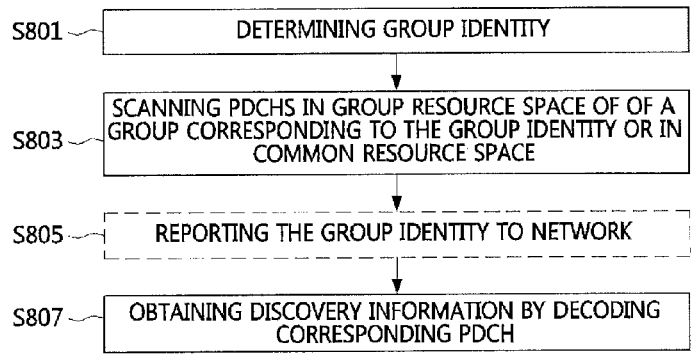

METHOD OF TRANSMISSION AND RECEPTION FOR DEVICE TO DEVICE DISCOVERY AND APPARATUS THEREOF

CLAIM FOR PRIORITY

This application claims priority to and the benefit of Korean Patent Applications No. 10-2012-0130437 filed on Nov. 16, 2012, No. 10-2013-0004624 filed on Jan. 15, 2013, and No. 10-2013-0139422 filed on Nov. 15, 2013 in the Korean Intellectual Property Office (KIPO), the entire contents of which are hereby incorporated by reference.

BACKGROUND

1. Technical Field

Example embodiments of the present invention relate in general to a technique of device-to-device discovery, and more specifically, to a method of transmission and reception for performing discovery between adjacent terminals efficiently.

2. Related Art

A device-to-device (D2D) discovery means a procedure that each terminal finds existences of counterpart terminals by receiving discovery information transmitted from geographically adjacent terminals through direct links between terminals.

All or some of terminals participating D2D discovery are required to transmit discovery information by appropriate physical channels, and to normally receive discovery information transmitted by transmitting terminals.

Thus, a channel structure for D2D discovery and a detail method of transmitting and receiving discovery information by the channel structure are demanded.

SUMMARY

Accordingly, example embodiments of the present invention are provided to substantially obviate one or more problems due to limitations and disadvantages of the related art.

An example embodiment of the present invention provides structures of frames channels applied to discovery between terminals.

Another example embodiment of the present invention provides a method of transmitting and receiving discovery information for discovery between terminals.

In some example embodiment, a method of discovery, performed in a terminal, may comprise selecting a discovery physical channel on which discovery information is transmitted in a discovery frame comprising a plurality of transmission durations; and transmitting the discovery information through the selected discovery physical channel.

Here, the discovery channel may be selected in a same transmission duration with adjacent other terminals in a specific discovery frame, and the discovery channel may be selected in a transmission duration different from transmission durations selected by other terminals belonging to a same cluster with the terminal in other discovery frames except the specific discovery frame.

Here, the method may further comprise receiving configuration information for transmitting the discovery information. Also, the configuration information may include information about positions and amount of discovery resources configured according to amount of discovery traffic and information about a structure of discovery frame.

Here, the discovery resources may be configured identically for all cells, or may be configured with common resources for all cells and cell specific additional resources for a specific cell.

Here, the terminal and other terminal may share the discovery physical channel, and the terminal and other terminal may use alternately the shared discovery physical channel for each discovery frame.

Here, the terminal may determine a group identity corresponding to the discovery information by using the discovery information which is shared by the terminal and a receiving terminal, select a resource space corresponding to the group identity, and select the discovery physical channel in the resource space.

Here, the discovery information may include at least one a discovery range class, a type of synchronization, information about mobility of the terminal, a capability of wireless area network (WLAN), channels which are used by the terminal, and a physical cell identity of a serving cell.

In other example embodiment, a method of discovery, performed in a terminal transmitting discovery information, may comprise determining a group identity corresponding to the discovery information; selecting a discovery physical channel in a resource space mapped to the group identity; and transmitting the discovery information using the selected discovery physical channel.

In still other example embodiment, a method of discovery, performed in a terminal receiving discovery information, may comprise determining a group identity based on the discovery information shared with a transmitting terminal; scanning a discovery physical channel in a resource space mapped to the group identity; and obtaining the discovery information from the scanned discovery physical channel.

In still other example embodiment, a method of discovery, performed in a terminal transmitting discovery information, may comprise selecting a specific cluster among a plurality of clusters each of which comprises a plurality of terminals; selecting a discovery physical channel in a resource space corresponding to the specific cluster; and transmitting the discovery information using the selected discovery physical channel.

Here, the specific cluster may be selected based on reception levels of discovery physical channels in each transmission duration of the specific discovery frame and occupation ratios of discovery physical channels in each transmission duration of the specific discovery frame.

Here, the discovery channel may be selected in a same transmission duration with other terminal belonging to the selected cluster in the specific discovery frame.

Here, the method may further comprise recognizing relative movement of the terminal from terminals belonging to the selected cluster based on reception levels of signals received from the terminals belonging to the selected cluster; and selecting again a cluster and a discovery physical channel based on the recognized movement.

In still other example embodiment, a method of discovery, performed in a terminal transmitting discovery information, may comprise selecting a discovery physical channel; selecting a demodulation reference signal (DM-RS) sequence among a plurality of DM-RS sequences; and transmitting the discovery information using the selected discovery physical channel and the selected DM-RS sequence.

BRIEF DESCRIPTION OF DRAWINGS

Example embodiments of the present invention will become more apparent by describing in detail example embodiments of the present invention with reference to the accompanying drawings, in which:

FIG. 7 is a flow cart to show a method for a transmitting terminal to transmit discovery information according to an example embodiment of the present invention;

FIG. 8 is a flow cart to show a method for a receiving terminal to receive discovery information according to an example embodiment of the present invention;

DESCRIPTION OF EXAMPLE EMBODIMENTS

Figure 1:
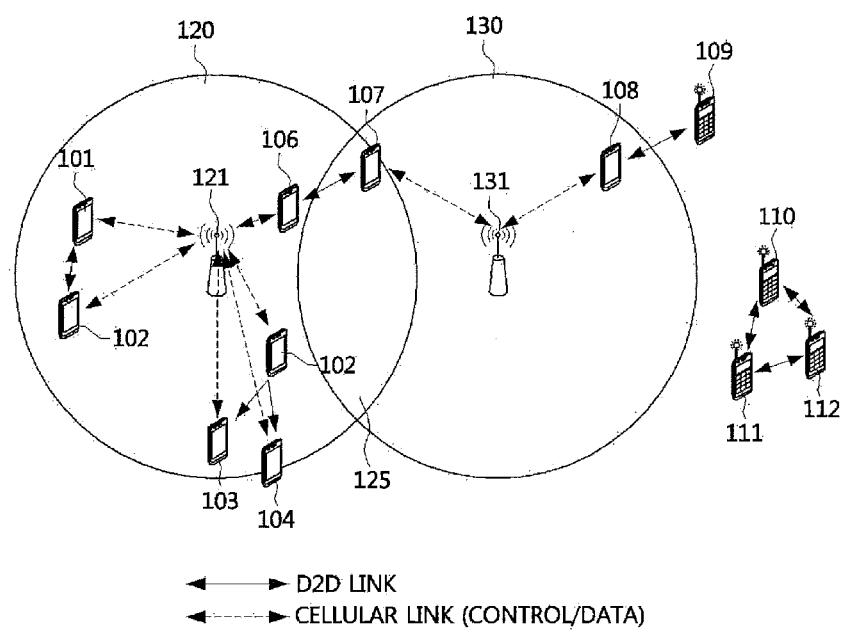
FIG. 1 is a conceptual diagram to show an example of various D2D discovery using direct link between terminals.

Example embodiments of the present invention are described below in sufficient detail to enable those of ordinary skill in the art to embody and practice the present invention. It is important to understand that the present invention may be embodied in many alternate forms and should not be construed as limited to the example embodiments set forth herein.

Accordingly, while the invention can be modified in various ways and take on various alternative forms, specific embodiments thereof are shown in the drawings and described in detail below as examples. There is no intent to limit the invention to the particular forms disclosed. On the contrary, the invention is to cover all modifications, equivalents, and alternatives falling within the spirit and scope of the appended claims.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

The term "terminal" used in this specification may be referred to as User Equipment (UE), a User Terminal (UT), a wireless terminal, an Access Terminal (AT), a Subscriber Unit (SU), a Subscriber Station (SS), a wireless device, a wireless communication device, a Wireless Transmit/Receive Unit (WTRU), a mobile node, a mobile, or other words. The terminal may be a cellular phone, a smart phone having a wireless communication function, a Personal Digital Assistant (PDA) having a wireless communication function, a wireless modem, a portable computer having a wireless communication function, a photographing device such as a digital camera having a wireless communication function, a gaming device having a wireless communication function, a music storing and playing appliance having a wireless communication function, an Internet home appliance capable of wireless Internet access and browsing, or also a portable unit or terminal having a combination of such functions. However, the terminal is not limited to the above-mentioned units.

Also, the term "base station" used in this specification means a fixed point that communicates with terminals, and may be referred to as another word, such as Node-B, eNode-B, a base transceiver system (BTS), an access point, etc. Also, the term "base station" means a controlling apparatus which controls at least one cell. In a real wireless communication system, a base station may be connected to and controls a plurality of cells physically, in this case, the base station may be regarded to comprise a plurality of logical base stations. That is, parameters configured to each cell are assigned by the corresponding base station.

Also, the term "network" used in this specification may include a mobile internet such as a Wireless Fidelity (WIFI), a Wireless Broadband Internet (WiBro), and a World Interoperability for Microwave Access (WiMax). Also, it may include 2G cellular network such as a Global System for Mobile communication (GSM) and a Code Division Multiple Access (CDMA), 3G cellular network such as a Wideband Code Division Multiple Access (WCDMA) and a CDMA2000. Also, it may include 3.5G cellular network such as a High Speed Downlink Packet Access (HSDPA) and a High Speed Uplink Packet Access (HSUPA). Also, it may include 4G or beyond 4G cellular network such as a Long Term Evolution (LTE) and a LTE-Advanced.

Hereinafter, embodiments of the present invention will be described in detail with reference to the appended drawings. In the following description, for easy understanding, like numbers refer to like elements throughout the description of the figures, and the same elements will not be described further.

FIG. 1 is a conceptual diagram to show an example of various D2D discovery using direct link between terminals.

Referring to FIG. 1, terminals 101 to 112 may be located in cell coverage 120 or 130 of cellular telecommunication network, may be located out of cell coverage, or may be located in an overlapped area 125 of two cell.

Terminals 101 to 107, which are located in the cell coverage 120 of a specific mobile telecommunication network, may perform discovery with terminals located in the same cell coverage 120, or may perform discovery with terminals located in adjacent cell coverage 130.

Also, a discovery between a terminal 108 in cell coverage 130 of mobile communication network and a terminal 109 out of the cell coverage 130 may be performed. A discovery between terminals 110 to 112, which are located out of cell coverage, may be performed.

In the case that the discovery between the terminals 101 to 107, which are located in the cell coverage 120 of mobile telecommunication network, is performed, the discovery between the terminals may be performed under assistance of a base station 121. That is, the base station 121 may broadcast configuration information about positions and amount of resources, structures of frames, and transmission mode used for terminals to transmit and receive discovery information as system information (SI), or may transfer configuration information to the each of terminals 101 to 106 by unicast.

Each terminal performing discovery may randomly select a discovery channel, or may select a discovery channel a reception level of which is the lowest, or may provide information measured by it to a base station, request a selection of discovery channel to the base station, and be allocated discovery channel by the base station. Each terminal transmits discovery information needed for notifying its existence through the discovery channel. Here, the discovery information, for example, may be generated by using a device identity (ID) of a terminal transmitting the discovery information and codes of application or service. Also, each terminal may figure out terminals or services existing near from itself by receiving the discovery channels based on the configuration information related to discovery.

On the other hand, in the case of terminals located out of cell coverage of mobile communication network, each terminal having equal capabilities may perform discovery by selecting discovery channel directly by itself according to a predetermined discovery channel structure and a transmission manner. Alternatively, one of terminals may provide configuration information about positions and amount of resources, structures of frames, and transmission mode used for discovery to other terminals by performing a function of controller, and the other terminals may select discovery channel based on the configuration information.

Alternatively, the terminal performing the function of controller may even provide a function of allocating radio resources for discovery in order to make discovery be performed.

The method that terminals out of cell coverage transmit/receive discovery information through discovery channels selected by themselves or allocated by the base station, and figure out terminals or services near from themselves is similar to the above method for the case of terminals in cell coverage of mobile communication network as explained above.

D2D discovery may be classified into a restricted type discovery and an open type discovery. In the restricted type discovery, discovery is enabled only when an explicit agreement of terminals to be discovered exists. On the contrary, in the open-type discovery, discovery is enabled without an explicit agreement of terminals to be discovered as explained above.

The discovery information transmitted for the restricted type discovery may include a discovery terminal identifier representing a specific identification information of the terminal transmitting the discovery information.

On the other hand, the discovery information transmitted for the open type discovery may include a service code representing a service provided by the terminal transmitting the discovery information, a discovery terminal identifier, or the combinational information of the service code and the discovery terminal identifier.

D2D Discovery Frame and Channel Structure

Hereinafter, structures of a D2D discovery frame and channels for a discovery method according to an example embodiment of the present invention.

Usually, a frame comprises a plurality of sub frames, and a sub frame comprises a plurality of slots in radio communication system. For example, a radio frame comprises 10 sub frames, and a sub frame comprises 2 time slots in $3^{rd}$ Generation Project Partnership (3GPP) Long Term Evolution (LTE) system.

Physical Discovery Channels (PDCHs) for the D2D discovery may be configured by using some or all of frequency resources of periodic sub frames or sub frame group.

Figure 2:
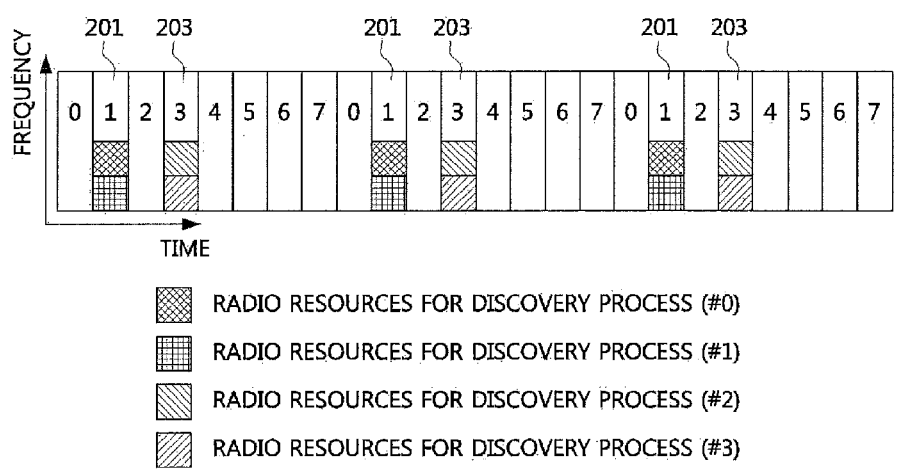
FIG. 2 is a conceptual diagram to show a configuration of discovery channel for D2D discovery according to an example embodiment of the present invention.

FIG. 2 is a conceptual diagram to show a configuration of discovery channel for D2D discovery according to an example embodiment of the present invention, and shows an example of a case that some of frequency resources of periodic sub frames are used for configuring the discovery channel.

Specifically, FIG. 2 represents a case that four discovery hopping processes are configured, and each discovery hopping process comprises multiple PDCHs.

Referring to FIG. 2, a discovery hopping process #0 may configure discovery channel by using some of frequency resources of each sub frame #0 201, and a discovery hopping process #1 may configure discovery channel by using some of frequency resources among frequency resources which are not overlapped with the frequency resources used by the discovery hopping process #0 among the frequency resources of each sub frame #0 201. Also, a discovery hopping process #2 may configure discovery channel by using some of frequency resources of each sub frame #3 203, and a discovery hopping process #3 may configure discovery channel by using some of frequency resources among frequency resources which are not overlapped with the frequency resources used by the discovery hopping process #2 among the frequency resources of each sub frame #3 203.

A PDCH may comprise a plurality of Discovery Resource Block (DRB), and use one discovery resource block per time slot.

Figure 3:
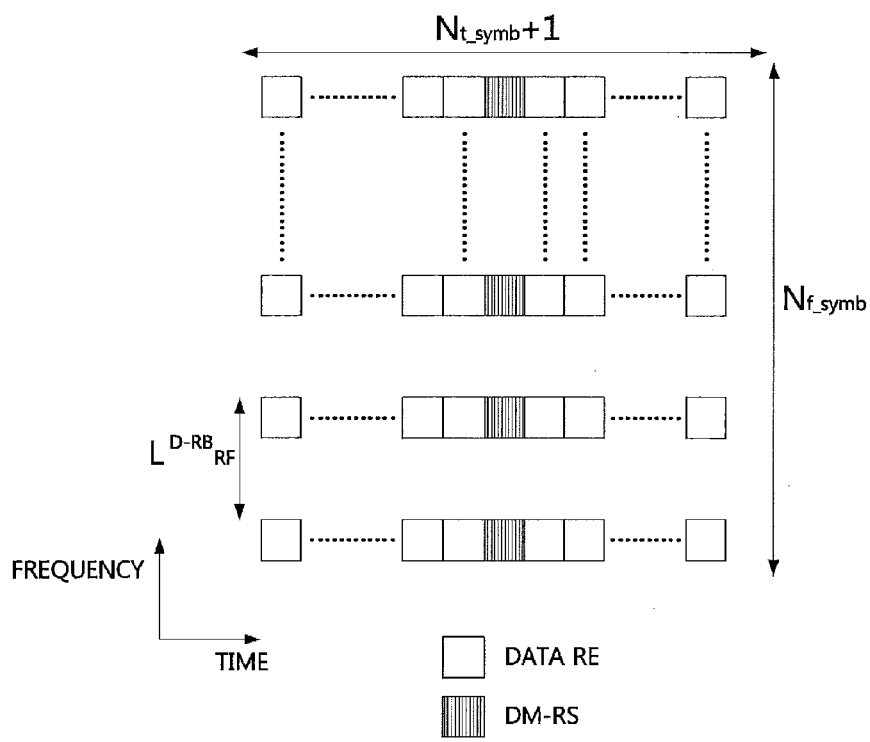
FIG. 3 is a conceptual diagram to show a form of resource mapping of discovery resource block according to an example embodiment of the present invention.

FIG. 3 is a conceptual diagram to show a form of resource mapping of discovery resource block according to an example embodiment of the present invention, and shows an example of the form of resource mapping of discovery resource block in a frequency-time resource space ($N_{f\_symb}$-$N_{t\_symb+1}$).

The followings are structural characteristics of discovery resource block

- Resource Elements (RE) constituting discovery resource block may be configured contiguously in time axis.
- REs constituting discovery resource block may be configured contiguously in frequency axis or configured with a predefined constant distance ($L^{D-RB}_{RF}$).
- Demodulation Reference Signal (DM-RS) may be transmitted for demodulating the PDCH.

In FIG. 3, positions of resource elements used for transmitting the DM-RS are the same as positions of data resource elements in frequency axis, and the DM-RS may occupy a symbol located exactly or roughly in the middle of symbols such as Orthogonal Frequency Division Multiplexing (OFDM) symbols or Single Carrier Frequency Division Multiple Access (SC-FDMA) symbols in time axis.

Figure 4:
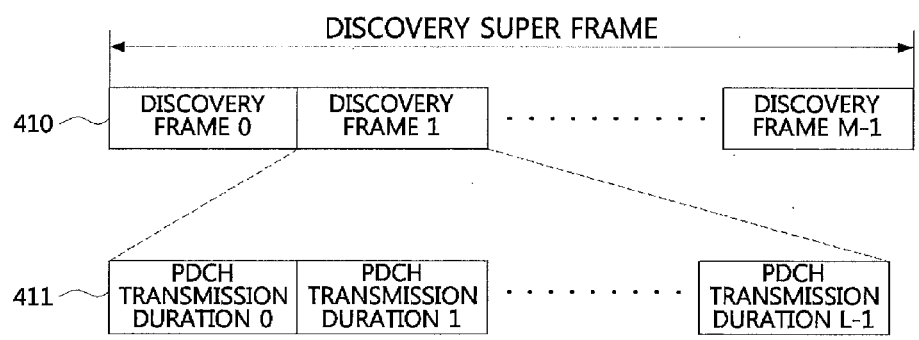
FIG. 4 is a conceptual diagram to show a structure of discovery frame according to an example embodiment of the present invention.

FIG. 4 is a conceptual diagram to show a structure of discovery frame according to an example embodiment of the present invention, and represents a structure of discovery frame configured by using discovery resource block for each discovery hopping process.

Referring to FIG. 4, a discovery super frame may comprise M (here, M is a natural number equal to or greater than 1) discovery frames 410, each of discovery frames 410 may comprise L (here, L is a natural number equal to or greater than 1) PDCH transmission durations 411. Here, the PDCH transmission durations may mean durations occupied by each of the PDCHs.

In selecting PDCH in time domain, the followings are considered.

Half-duplexing operation of terminal: according to the half-duplexing operation, a terminal transmitting discovery signal cannot receive discovery signal transmitted by other terminal, during transmission time of itself.

Near-far problems of terminals: when terminals receive a plurality of discovery signals in the same reception duration, differences of levels of received signals may be generated based on differences of distances between a transmitting terminal and each of the receiving terminals. Also, a power control cannot be a solution of the near-far problem, since the D2D discovery signals are transmitted to a plurality of reception terminals. Therefore, although an automatic gain control (AGC) is performed properly in the receiving terminal, that is, the AGC is performed based on a signal having a large reception power, a signal having low reception power may undergo degradation of demodulation performance or may fall into a desensing state, due to quantization noises from analog-to-digital converter (ADC). Also, the signal having large reception power may generate severe subcarrier interferences to the signal having low reception power.

In order to overcome the above-mentioned problems of detection-missing and desensing due to the half-duplexing operation of terminal and the near-far problem between transmitting terminals and receiving terminals, a time-axis hopping of the PDCH transmission durations by using Latin Square matrix and others, that is, a randomization of the PDCH transmission durations may be applied. In the case that the time-axis hopping of the PDCH transmission durations is performed by using Latin Square matrix, the number of discovery frames (M) and the number of PDCH transmission durations (L) become the same, that is, M=L.

Figure 5:
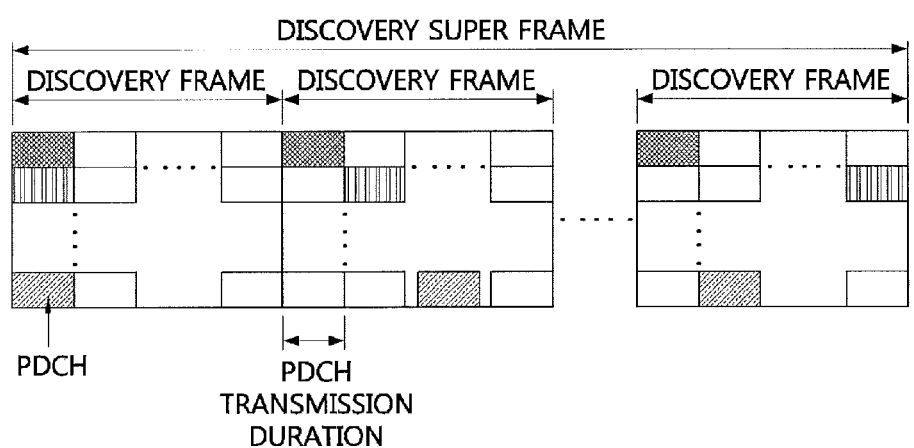
FIG. 5 is a conceptual diagram to show a method of hopping of PDCH transmission durations according to an example embodiment of the present invention.

FIG. 5 is a conceptual diagram to show a method of hopping of PDCH transmission durations according to an example embodiment of the present invention, and represent an example of a structure in that PDCH transmission durations are hopped in time-axis per each discovery frame.

Referring to FIG. 5, a discovery super frame comprises a plurality of discovery frames, and each discovery frame comprises a plurality of PDCH transmission durations. In the above mentioned structure, a PDCH set comprises PDCHs transmission duration of which is hopped according to a predetermined rule every discovery frames. Also, one PDCH in the PDCH set corresponds to one discovery frame respectively. Thus, if a terminal uses a specific PDCH in a specific discovery frame, other PDCHs belonging to the same set with the specific PDCH should be used in discovery frames following the specific discovery frame. In a case that the PDCHs are hopped in time-axis by using Latin Square matrix, only one PDCH in a PDCCH set may be located in the same transmission duration with other PDCHs of other PDCCH sets only in one discovery frame in whole discovery super frame. In the one discovery frame, since terminals transmit discovery information by using a PDCH corresponding to each terminal through half-duplexing mode, the terminals cannot receive PDCH signals transmitted from other terminals. However, since PDCH transmission durations of the terminals are different to each other in other discovery frames except the one discovery terminal, reception of the PDCH between each other may be possible.

Also, due to the above mentioned near-far problem, there may be a case that an arbitrary terminal cannot receive a PDCH signal in a specific discovery frame. However, a discovery frame in which it is possible to receive PDCHs belonging to the corresponding PDCH can be available by applying PDCCH hopping in unit of discovery frame.

Also, in order to achieve frequency diversity, each PDCH set may be configured so that PDCHs of it are hopped to other frequency resource in frequency axis every discovery frame.

Another method for overcoming the above-mentioned problems of detection-missing and desensing due to the half-duplexing operation of terminal and the near-far problem between transmitting terminals and receiving terminals is making each terminal wanting to transmit discovery information to select a PDCH randomly in every discovery frames. In this case, there is a probability of collision that more than two terminals select the same PDCH. However, if the number of PDCHs is large as compared to the number of transmitting terminals, the probability of collision may be lowered below a predefined level. Also, the number of terminals which can be discovered may be increased by transmitting discovery information in a large number of discovery frames.

Constitution and Configuration of D2D Discovery Frame

Hereinafter, a constitution of D2D discovery frame and a method of configuring the same are explained in detail.

For the constitution and configuration of D2D discovery frame, the following are considered.

An amount of discovery traffic may vary according to time.

An amount of discovery traffic may vary according to areas.

Sizes of discovery information for the restricted type discovery and the open type discovery may be different.

Amounts of discovery traffic of the restricted type discovery and the open type discovery may be different.

Power consumption and complexity, related to discovery, of devices should be minimized.

First, a method for accommodating temporal changes of the amount of discovery traffic is that a base station or a specific terminal (a specific terminal among terminals out of cell coverage) identifies temporal changes of the amount of discovery traffic, changes the amount of discovery resources when necessary, and reports configuration information to the terminals. The configuration information may include the number of discovery processes (not included if only one discovery process exists), positions and amount of discovery resources for each discovery process, discovery frame structure, and transmission mode, etc. The above configuration information may be transferred from a base station (or a specific terminal) to each terminal by system information broadcasting or dedicated signaling for each terminal.

The easy way for accommodating the variable amount of discovery traffic according to areas is configuring the same discovery resources for all the cells independently of amount of discovery traffic. In this case, if a terminal selects a channel having the lowest reception level when selecting a PDCH for transmitting discovery information, as a result, terminals in relatively shorter distance may select the same PDCH in an area having much discovery traffic so that a range of discovery may be decreased relatively.

Another way for accommodating the variable amount of discovery traffic according to areas is configuring primary resources common to all the cells, and configuring additional resources for a cell (or cells) in an area having much discovery traffic.

The fact that sizes of the amounts of discovery information for the restricted type discovery and the open type discovery are different may mean that the numbers of discovery resource blocks for PDCH may be different for the restricted type discovery and the open type discovery. Therefore, in this case, a first solution is that separate discovery hopping processes are configured for each of the restricted type discovery and the open type discovery. Alternatively, a second solution is that a discovery hopping process is divided into two PDCH frequency groups in frequency axis, and the divided PDCH frequency groups are used separately for the restricted type discovery and the open type discovery. Alternatively, a third solution is that a discovery hopping process is used commonly for both the restricted type discovery and the open type discovery without dividing the discovery hopping process in frequency axis. Of course, the above solutions are applicable to a case that sizes of discovery information are identical for the restricted type discovery and the open type discovery.

In the second and the third solution, in the case that a temporal length of PDCH ($PDCH_O$) for the open-type discovery is n times greater than a temporal length of PDCH ($PDCH_R$) for the restricted-type discovery ($PDCH_O=n\times PDCH_R$), a unit discovery channel resource may be used for a $PDCH_O$, and used for n $PDCH_R$s by dividing a unit discovery channel into n $PDCH_R$s. Also, for the third solution, if the numbers of discovery resource blocks (DRBs) constituting a PDCCH for the restricted type discovery and the open type discovery are different from each other, both a case that the unit discovery channel is used as $PDCH_R$s and a case that the unit discovery channel is used as a $PDCH_O$ should be considered in a receiver. That is, the receiver is required to perform a blind decoding. The configuration information may also be broadcasted as system information or transferred to each terminal by terminal specific dedicated signaling.

Also, methods to minimize a power consumption of terminal related to discovery and complexity of terminal are required to be considered. First, in the aspect of transmission, a method of decreasing a frequency of discovery information transmissions may be applied. For example, more than two terminals may share a PDCH and transmit discovery information of each in turn every another frame. Meanwhile, in the aspect of reception, since power consumption of complexity of terminal may be increased much in the case of scanning whole frequency resources (that is, all the PDCHs), a range of PDCHs which a terminal is required to scan at the time of receiving the PDCHs, discovery scan space should be minimized. A method of minimizing the discovery scan space is a method of decreasing the range of scan only to PDCHs related to information which a receiving terminal desires to discovery.

A method for minimizing the discovery scan space is a method of dividing the discovery information to be transmitted and whole discovery resource space into multiple groups, and mapping the divided discovery information groups onto the divided specific resource spaces. In this case, a transmitting terminal selects a PDCH from a resource space of a group corresponding to discovery information which the transmitting terminal will transmit, a receiving terminal scans only resource space corresponding to discovery information which the receiving terminal desires to search, and so the discovery scan space may be minimized.

The above mentioned method of minimizing the discovery scan space is explained in detail. First, in the case that resources for restricted type discovery and open type discovery are separated, a terminal participating restricted (open) type discovery is required to scan only resource space for restricted (open) type discovery. Then, the range of scan may be reduced by grouping all or some of information shared by transmitting terminal and receiving terminal into a plurality of resource groups, mapping each group onto specific resource space, making a transmitting terminal to select a PDCH in the mapped resource space and transmit discovery information through the selected PDCH, and making a receiving terminal to scan only PDCHs in the corresponding resource space. A hash function may be used as a specific method for dividing the resource space into groups.

For restricted type discovery, a group identity may be determined, as an example, based on a discovery identity shared by a transmitting terminal and a receiving terminal. That is, if a discovery identity is inputted to a hash function, an output of the hash function may be an identity of a specific group. A transmitting terminal may select a PDCH in a specific resource space corresponding to the identity of the specific group, and a receiving terminal may scan only PDCHs in the specific resource space corresponding to the identity of the group.

If discovery identity is assigned to terminals, by using the above-mentioned characteristics, so that terminals belonging to a specific organization (for example, a group of terminals of fire workers) are mapped onto the same group identity after applying a hash function, terminals can scan only resource space onto which the corresponding group identity is mapped in order to find other terminals belonging to an organization of itself. Of course, in this case, a specific resource space may be assigned to a specific organization/objective separately, and so only the corresponding resource space may be scanned independently of discovery identity.

On the other hand, like the case of restricted type discovery, a group identity may be determined based on all or some of information shared by transmitting terminal and receiving terminal also in open-type discovery. For example, a service code may be used for determining group identities in open-type discovery. In other words, the service code may be inputted into a hash function, and a specific group identity may be obtained as an output of the hash function. Thus, the transmitting terminal may select a PDCH in a specific resource space corresponding to the group identity, and the receiving terminal may scan PDCHs only in the specific resource space corresponding to the group identity.

If the discovery scan space is minimized by the above-mentioned methods, the complexities and power consumption of a terminal receiver may be decreased. However, if the number of terminals belonging to a specific group of a specific area becomes large relatively to the number of PDCHs in resource space of the corresponding group, a problem that an empty PDCH, that is a PDCH having a low reception level, cannot be found in each group may occur, and, in this case, a range of discovery may be reduced very significantly since a PDCH having a relatively high reception level should be selected. In order to alleviate the above-mentioned situation, a separate common resource space may be configured. Also, when a PDCH having a low reception level does not exist in a resource space which is mapped onto a specific group or the number of PDCHs having a low reception level is equal to or smaller than a predetermined value, a PDCH having a low reception level may be selected in the common resource space. Of course, in this case, the receiving terminal should scan both the resource space which is mapped onto the specific group and the common resource space. When a PDCCH is selected randomly every discovery frames, the receiving terminal may be configured to select the resource space which is mapped onto the specific group or the common resource space by using a probability value provided by a system, and to select a PDCCH in the selected resource space.

Each of the group-specific resource spaces and the common resource space may correspond to respective discovery hopping processes, or may be configured into a discovery hopping process as divided.

Figure 6:
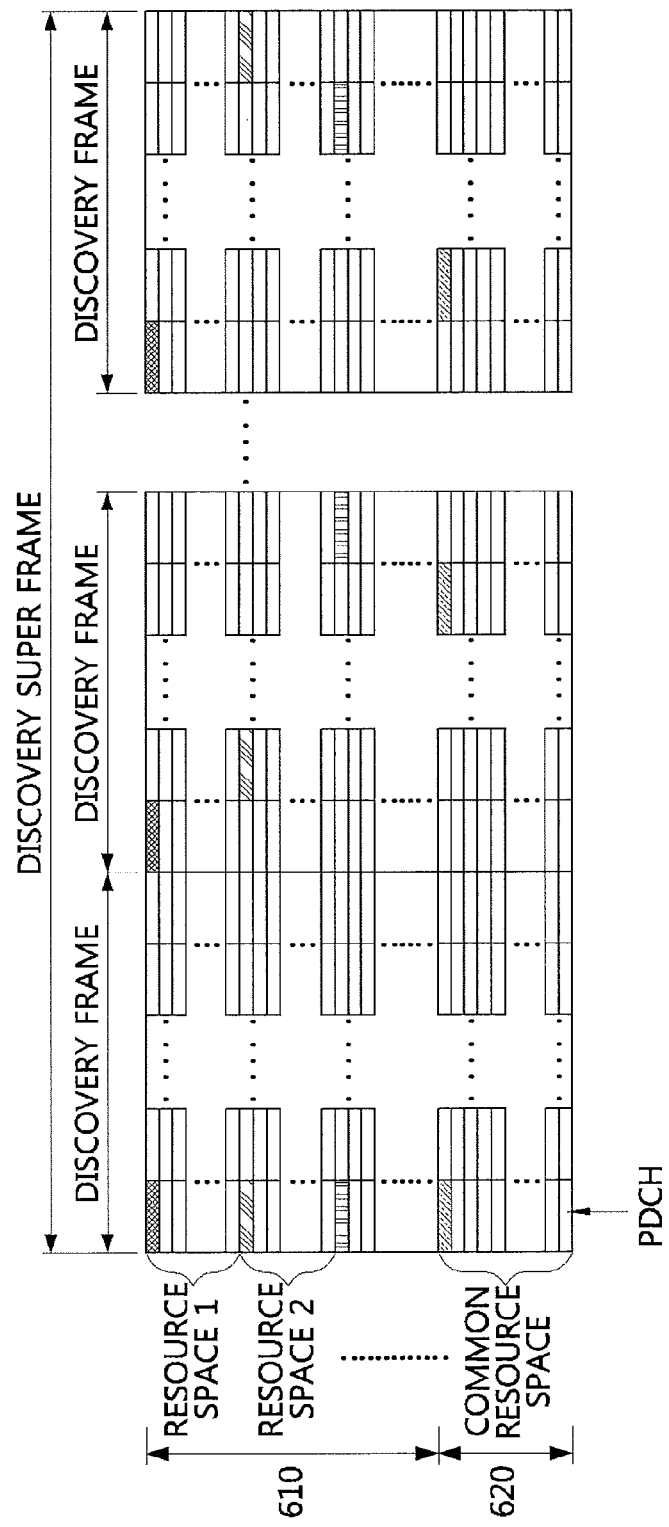
FIG. 6 is a conceptual diagram to show a method of configuring discovery frame according to an example embodiment of the present invention.

FIG. 6 is a conceptual diagram to show a method of configuring discovery frame according to an example embodiment of the present invention, and represents an example that resource spaces of a discovery hopping process is divided into a group-specific resource space and a common resource space in frequency axis.

Referring to FIG. 6, a discovery super frame may comprise a plurality of discovery frames, each discovery frame may comprise a plurality of PDCHs, and each discovery frame may comprise a plurality of group-specific resource spaces 610 and a common resource space 620, in a method of configuring discovery frame according to an example embodiment of the present invention.

The common resource spaces may be configured commonly for the restricted and open type discovery, or may be configured separately for the restricted and open type discovery. Also, a transmitting terminal may be configured to use a PDCH belonging to the common resource spaces for transmitting discovery message and the like which all the terminals participating discovery should receive.

Hereinafter, operation examples of transmitting terminal and receiving terminal will be explained in the case of configuring discovery resource divided as shown in FIG. 6.

FIG. 7 is a flow cart to show a method for a transmitting terminal to transmit discovery information according to an example embodiment of the present invention, and represents a procedure for a transmitting terminal to transmit discovery information in the case of using discovery resources as divided.

First, the transmitting terminal may determine a group identity for transmitting discovery information (at S701). Here, in the case of restricted type discovery, the transmitting terminal may obtain the group identity as an output of a hash function, to which information shared by the transmitting terminal and the receiving terminal (for example, a discovery identity) is inputted. Otherwise, in the case of open-type discovery, the transmitting terminal may obtain the group identity as an output of a hash function, to which a service code of itself is inputted.

Then, the transmitting terminal may measure reception levels of PDCHs belonging to group-specific resource spaces corresponding to the group identity (at S703), and determine whether PDCH(s) having a reception level equal to or less than a predetermined reference level exist or not (at S705). If at least one PDCH having reception level equal to or less than the predetermined reference level exists, a PDCH having the lowest reception level is selected (S707). When the common resource space is not configured, a PDCH having the lowest reception level among PDCHs belonging to a resource space corresponding to the determined group identity is selected.

Alternatively, if at least one PDCH having reception level equal to or less than the predetermined reference level does not exist, the transmitting terminal may measure reception levels of PDCHs belonging to the common resource spaces (at S709), and determine whether PDCH(s) having a reception level equal to or less than a predetermined reference level exist or not (at S711). If at least one PDCH having reception level equal to or less than the predetermined reference level exists, a PDCH having the lowest reception level is selected (S713).

Alternatively, in the case that a PDCH meeting the requirement (that is, the requirement of having a reception level equal to or less than the predetermined reference level) does not exist in the common resource spaces, the transmitting terminal may select a PDCH showing the lowest reception level in the resource spaces corresponding to the group identity, or in the common resource spaces (at S715).

Meanwhile, the transmitting terminal may select a PDCH only in the common resource spaces, in the case of transmitting discovery information which all the terminals participating discovery should receive. That is, the transmitting terminal may select a PDCH having the lowest reception level among PDCHs belonging to the common resource spaces. That is, the transmitting terminal may perform only the steps of S709 and S713.

The transmitting terminal may transmit discovery information by using a PDCH selected through one of the steps S707, S713 and S715 (at S717).

FIG. 8 is a flow cart to show a method for a receiving terminal to receive discovery information according to an example embodiment of the present invention, and represents a procedure for a receiving terminal to receiving discovery information in the case of using discovery resources as divided.

Referring to FIG. 8, the receiving terminal may input information shared by the transmitting terminal and the receiving terminal (for example, a discovery identity) in the case of restricted type discovery, and a service code which is desired to be found in the case of open type discovery, to a hash function, so as to determine a group identity (at S801).

Then, the receiving terminal may scan PDCHs belonging to the group-specific resource spaces corresponding to the determined group identity and the common resource space (at S803).

Optionally, the receiving terminal may report the group identity which the receiving terminal uses for the scan to a network, so that a base station may use it for configuring discovery resources, etc. (at S805).

The receiving terminal may select PDCH through the scanning procedure as described above, and obtain discovery information by decoding the selected PDCH (at S807).

In another example embodiment of operations of a transmitting terminal and a receiving terminal for the case that discovery resource are configured as divided, if the transmitting terminal wanting to transmit discovery information randomly selects a PDCH every discovery frames, the transmitting terminal may obtain a group identity similarly to the above explained embodiment, select a PDCCH randomly in a resource space of the corresponding group, and transmit the discovery information through the selected PDCCH. In this case, an operation of the receiving terminal is identical to that of the receiving terminal in the above explained embodiment.

The configuration information of the group-specific resource spaces which are mapped to each group identity, the common resource space, etc. may be broadcasted in form of system information, or may be transferred through a terminal specific dedicated signaling. Also, since it is necessary that the number of groups and/or sizes of each resource spaces are different according to the number of terminals participating discovery, the information on a hash function may be included in the system information, or may be transferred in the way of terminal specific dedicated signaling.

Solution of Near-Far Problem in D2D Discovery

Hereinafter, a solution of the near-far problem in a method of discovery for D2D communication according to an example embodiment of the present invention will be explained in detail.

As described above, the methods suggested to resolve the near-far problem include a method of temporal hopping of PDCHs by discovery frame, that is, a randomization of transmission durations, and a method of randomized PDCH selection by discovery frame.

However, the above mentioned methods of temporal hopping of PDCHs by discovery frame and randomized PDCH selection by discovery frame may cause increase of discovery time and decrease of reception success probability due to reasons including the sensing according to the near-far problem, and have a shortcoming that the range of discovery decreases as density of terminals increases.

Also, in the methods of temporal hopping of PDCHs by discovery frame and randomized PDCH selection by discovery frame, if an amplification prior to analog to digital conversion (ADC) part on received discovery signal in the receiving terminal is excessive, a saturation on the received signal may be caused, and so a receiving performance on all the PDCH signals which have been received may be degraded much according to severe distortions on signals outputted by an amplifier. Thus, in order not to cause the above mentioned situation (that is, saturation of the amplification), an automatic gain control (AGC) may be applied. However, in this case, amplification level in many time durations may be insufficient, and this may decrease the number of effective bits in the ADC (that is, increasing quantization noise) so as to cause a degradation of a receiving performance in the receiving terminal.

In order to overcome the above mentioned shortcoming, in an example embodiment of the present invention, methods of clustering and randomization are used as will be explained hereinafter.

In the methods of clustering and randomization, terminals adjacent to each other are configured as a geographical cluster. Then, a clustering method that terminals belonging to the same cluster transmit discovery information through PDCH in the same transmission duration in at least one special discovery frame, and the randomization methods, temporal hopping of PDCHs by discovery frame and randomized PDCH selection by discovery frame, which were described above, are performed in other frames except the specific discovery frame may be applied together.

Figure 9:
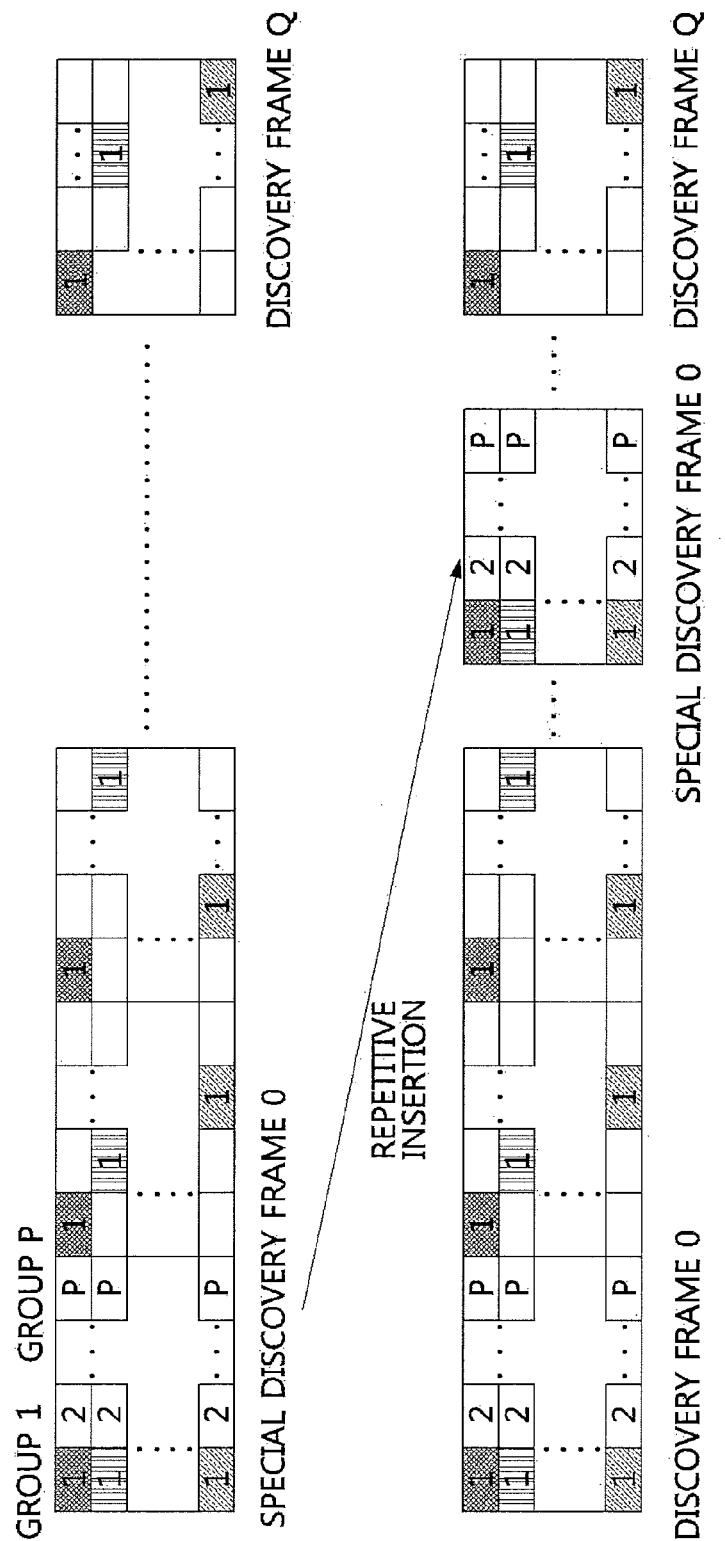
FIG. 9 is a conceptual diagram to explain a clustering and randomization method according to an example embodiment of the present invention.

FIG. 9 is a conceptual diagram to explain a clustering and randomization method according to an example embodiment of the present invention.

Referring to FIG. 9, in the case that each discovery frame comprises P transmission durations, a cluster may be mapped to a transmission duration (that is, PDCHs in a transmission duration) among the P transmission durations of a special discovery frame. Also, terminals belonging to each cluster may transmit discovery signal by using a PDCH included in a transmission duration corresponding to their cluster in the special discovery frame, and receive discovery signal from other terminals belonging to other clusters in other transmission durations.

For example, in a special discovery frame (a discovery frame #0), terminals belonging to a first cluster may transmit discovery signal by using a PDCH belonging to a first transmission duration (group 1), terminals belonging to a second cluster may transmit discovery signal by using PDCH belonging to a second transmission duration (group 2) in discovery frame #0, and the terminals belonging to the first cluster may receive discovery signals transmitted from terminals belonging to other clusters in transmission durations including from the second transmission duration (group 2) to the P transmission durations (group P) except the first transmission duration (group 1). Here, the number of clusters may be identical to the number of transmission durations (groups) included in a discovery frame.

In other discovery frames except the discovery frame #0, a transmitting terminal may transmit discovery information using a PDCH determined according to the method of temporal hopping of PDCHs by discovery frame or the method of randomized PDCH selection by discovery frame Also, the special discovery frame may exist only once for whole period of the hopping process, or may be inserted repeatedly at an interval of several discovery frames as shown in FIG. 7. As an example, the special discovery frame in which adjacent terminals transmit discovery information by using PDCHs in the same transmission duration and at least one discovery frame to which the method of temporal hopping of PDCHs by discovery frame or the method of randomized PDCH selection by discovery frame is applied may be positioned in turn.

On the other hand, for a method for each terminal to select its cluster, a method that each terminal is configured to select, if possible, a cluster which terminals having high reception level belong to, and to be distributed to each cluster at the same time may be applied.

An example of methods of selecting cluster, that is, transmission duration in a special discovery frame, and PDCH in the transmission duration for each terminal may be as follows.

1) For each transmission duration in the special discovery frame, a terminal may measure reception levels of PDCHs and processed them appropriately. For example, the terminal may determine the numbers of channels ($K_1$, $K_2$, . . . ) having reception levels equal to or above predefined reception levels ($th_{H1}$, $th_{H2}$, . . . ; $th_{H1}$>$th_{H2}$> . . . ), their reception levels, the numbers of channels ($L_1$, $L_2$, . . . ) having reception levels equal to or below predefined reception levels ($th_{L1}$, $th_{L2}$, . . . ; $th_{L1}$<$th_{L2}$< . . . ), and so on. According to the numbers of channels having reception levels equal to or below predefined reception levels, a degree of occupation of PDCHs in the corresponding transmission duration may be identified, and terminals can be distributed to each cluster as evenly as possible by using it.

Here, when the method of temporal hopping of PDCHs by discovery frame is used, for a specific PDCH, each terminal may identify which transmission duration PDCHs belonging to the same set with the specific PDCH belong to. By using this fact, equal measurement can be performed for other discovery frames.

2) Each terminal may select a cluster, that is, transmission duration in a special discovery frame based on the measured values. For example, a terminal may select a cluster which has the greatest $K_1 \times L_1$. Also, a terminal may use the reception levels additionally for selecting cluster.

3) A terminal may select a PDCH having the lowest reception level among PDCHs belonging to the corresponding cluster, that is, transmission duration in a special discovery frame. Or, a terminal may select a PDCH randomly in the corresponding transmission duration.

Through the above mentioned methods, reception levels of received signals from terminals belonging to each cluster in the special discovery frame may be configured similarly to each other. A probability that terminals located with a large distance transmit discovery signal at the same duration may be minimized.

On the other hand, In FIG. 9, in other discovery frames except the special discovery frame, terminals belonging to the same cluster are configured to transmit discovery signal in different transmission durations by applying randomization (for example, PDCH hopping or randomized PDCH selection by discovery frame), and so a terminal may receive discovery signal transmitted from other terminals belonging to the same cluster as well as other clusters.

In the case that the clustering and the randomization, as described above, are applied, reception levels of discovery signals received in each transmission duration of the special discovery frame are not so much different from each other, and so it may be successful to receive discovery signal from terminals belonging to other clusters (that is, terminals which are not adjacent) when appropriate automatic gain control is applied to each transmission duration with a high probability.

Also, in other discovery frames except the special discovery frame, each receiving terminal may receive discovery signals having high reception level from terminals belonging to the same cluster with a very high probability in each transmission duration. Thus, a probability that the receiving terminal successfully receives discovery signal transmitted from adjacent terminal in discovery frames except the special discovery frame may be increased, and a decrease of discovery time and/or an increase of probability of successful receiving of discovery signal may be achieved as a result.

In the case that a terminal is out of cell coverage, a terminal may transmit discovery signal by using a PDCH selected by the terminal itself according to the above described method. In the case that a terminal is in cell coverage, a terminal may transmit discovery signal by using a PDCH selected by the terminal itself in the same manner as the out-of cell coverage case, or may determine PDCH which will be used by the terminal by selecting at least one candidate PDCH according to the above mentioned method, reporting information on the selected at least one candidate PDCH to a base station, and configuring, by a the base station, PDCH which will be used by the terminal based on the information received from the terminal.

The method of clustering and randomization has advantages of decreasing discovery time and/or increasing a success probability of discovery signal reception, maintaining or increasing discovery range independently of density of terminals. The above advantages may be remarkable especially in the case of fixed type terminals and in the environment that mobility of terminals are low, such as a stadium, an exhibit hall and so on.

In many cases, characteristics of received signal may be maintained by clustering. That is, although transmitting terminals using open type discovery may be a mobile terminal, most of the transmitting terminals using open type discovery may be fixed type. Since most of the terminals participate discovery only during necessary time also in the case of restricted type discovery, moving speed of the terminals may be low (that is, it is estimated that most of terminals participating discovery have low moving speed), transmission time length of discovery signal is not long, and so cluster change is not necessary. However, in the case that terminals are moving, it may be difficult to maintain the characteristics of received signals by clustering, and it may become more difficult especially in the special discovery frame as shown in FIG. 9.

For mitigating performance degradation due to mobility of terminal, a method of recognizing change of environment and performing appropriate processes on the recognized change may be performed. That is, if a terminal recognizes that it is a predetermined distance far from terminals belonging to a cluster which the terminal has originally selected according to relative movements of the terminals, the terminal may resolve or mitigate problem of channel collision caused by the movement by selecting new cluster and PDCH.

Environmental change may be recognized by measuring a reception level of each PDCH. Example embodiments of the method of recognizing an environmental change are as follows.

1) A terminal may receive discovery signal continuously or non-continuously in addition to transmitting discovery signal.
2) For each transmission duration in the special discovery frame, a terminal may measure reception levels of PDCHs. When the clustering and the temporal hopping of PDCH by discovery frame are used, the above measurement may be performed equally in other discovery frames as well as the special discovery frame.
3) A terminal may recognize an environmental change based on the measured values. For example, a terminal may obtain an average and/or a variance of reception levels having a value equal to or above a predefined threshold among reception levels measured in each transmission duration. Then, a terminal may recognize a need of changing discovery channel when some of transmission durations have an average and/or a variance having a difference above a predetermined difference from an average and/or a variance which are measured a predetermined time earlier.

As another example embodiment of the method of recognizing an environmental change, considering the case that other terminals also can move with the terminal, the terminal may determine whether environmental changes occur or not based on degree of signal level changes of signals received from fixed type terminals which was adjacent at the time of selecting current cluster. For this, bit(s) indicating whether a terminal is fixed or mobile may be included in D2D discovery information.

Configuration information about a structure of discovery frame, a method of selecting PDCH, etc. may be broadcasted in form of system information (SI), or be transferred to terminals via terminal specific dedicated signaling.

Coverage Extension for D2D Discovery

Hereinafter, methods for D2D discovery coverage extension will be explained.

[Problem of PDCH Coverage Overlapping]

In order to increase efficiency of frequency reuse, it is desirable that PDCH resources are spatially reused. However, if terminals transmitting discovery information by using the same PDCH resources are located adjacent to each other, a problem of PDCH coverage overlapping may be occurred.

Figure 10:
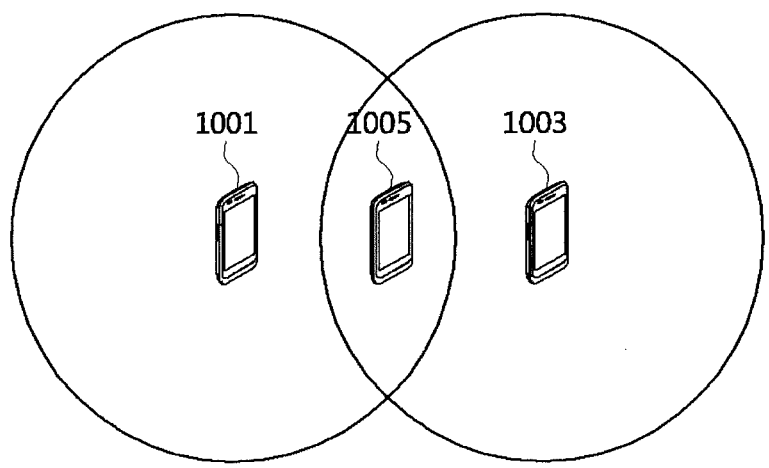
FIG. 10 is a conceptual diagram to explain a problem of PDCH coverage overlapping of terminals using the same PDCH resources.

FIG. 10 is a conceptual diagram to explain a problem of PDCH coverage overlapping of terminals using the same PDCH resources.

In FIG. 10, when a first terminal and a second terminal are located out of PDCH detection area of each other, the two terminals may select the same PDCH or may be allocated with the same PDCH. Then, if the two terminals are fixed, distance between the two terminals may be maintained without change. Otherwise, if at least one of the two terminals moves, the distance between the two terminals may change.

However, as shown in FIG. 10, independently of whether the first and second terminals 1001, 1003 move or not, a coverage of the first terminal 1001 and a coverage of the second terminal 1003 may be overlapped, and a terminal such as a third terminal 1005 may be located in the area in which the PDCH coverage of the first terminal 1001 and the PDCH coverage of the second terminal 1003 are overlapped. Here, if DM-RS sequences used by the first terminal 1001 and the second terminal 1003 are identical, the third terminal 1003 may perform channel estimation based on sum of two DM- RS, which may cause false channel estimation. Thereby, demodulation performance of PDCH in the third terminal 1003 may degraded.

[Selection of PDCH and DM-RS Sequence]

As shown in FIG. 10, in order to mitigate a problem of false channel estimation due to the overlapped coverage, the first terminal 1001 and the second terminal 1003 may be configured to use DM-RS sequences different to each other.

When two terminals, coverages of which are overlapped, are configured to use DM-RS sequences different to each other, degradation of channel estimation performance, which can be occurred during receiving signal by a terminal located in the overlapped area of PDCH coverages of the two terminals, may be resolved or mitigated. Consequently, discovery coverage may be extended.

For this, a method of defining DM-RS sequence set, which comprise orthogonal or semi-orthogonal DM-RS sequences and making terminals using the same PDCH use DM-RS sequences different to each other in the DM-RS sequence set is required to be applied.

Hereinafter, methods of selecting PDCH and DM-RS sequence, which may be applied according to the above mentioned method for resolving near-far problem are explained.

1) A Case of Applying a Randomization Method of Temporal Hopping of PDCHs by Discovery Frame Case 1a: An Optimal Method
- A. For all the PDCHs, a terminal wanting to transmit discovery information measures reception level of DM-RS symbols by applying corresponding DM-RS sequence to each of all PDCHs. Here, the measurement of reception level may be performed by multiplying the corresponding DM-RS sequence to received subcarriers constituting DM-RS symbols, summing them, and measuring the total amount of the summed result. Also, an average of reception levels of more than two DM-RS symbols may be acquired in the measurement.
- B. According to the measurement result, PDCH and DM-RS sequence having the lowest reception level are selected.

Case 1b: A Semi-Optimal Method to Decrease Receiver Complexity
- A. a terminal wanting to transmit discovery information measures respective reception energy for all the PDCHs. Here, the measurement on reception energy may be performed by measuring energies of each received symbol constituting PDCH, summing all of them or obtaining an average of them.
- B. At least one PDCH having the measured reception energy equal to or below a predefined level is selected.
- C. Measuring reception level of DM-RS symbol by applying all the DM-RS sequences to each of the at least one PDCH.
- D. According to the measurement result, PDCH and DM-RS sequence having the lowest reception level are selected.

2) A Case of Applying a Method of Selecting PDCH Randomly Every Discovery Frame

Similarly to the selecting PDCH, a DM-RS sequence is selected randomly among a set of DM-RS sequences.

3) a Case of Applying a Clustering Method and a Method of Temporal Hopping of PDCHs by Discovery Frame Case 3a: An Optimal Method
- A. A terminal wanting to transmit discovery information selects a specific cluster according to the above mentioned clustering method and temporal hopping method.
- B. The terminal measures reception level of DM-RS symbols by applying all the DM-RS sequences to each of PDCHs belonging to a transmission duration in a special discovery frame mapped to the selected specific cluster, or PDCHs in other discovery frames except the special discovery frame which are belonging to the same set with the each of PDCHs.
- C. The terminal select PDCH and DM-RS sequence having the lowest reception level according to the measurement result.

Case 3b: A Semi-Optimal Method to Decrease Receiver Complexity
- A. A terminal wanting to transmit discovery information selects a specific cluster according to the above mentioned clustering method and temporal hopping method.
- B. The terminal measures respective reception energy for all PDCHs belonging to a transmission duration in a special discovery frame mapped to the selected specific cluster, or PDCHs in other discovery frames except the special discovery frame which are belonging to the same set with the all PDCHs.
- C. The terminal selects at least one PDCH having the measured reception energy equal to or below a predefined level.
- D. The terminal measures reception level of DM-RS symbols (or average reception level) by applying all the DM-RS sequences to each of the selected PDCHs.
- E. The terminal select PDCH and DM-RS sequence having the lowest reception level according to the measurement result.

In performing the procedures of selecting PDCH and DM-RS sequence, the terminal may select at least one candidate pair of PDCH and DM-RS sequence according to the above mentioned methods, and report at least one candidate pair to a base station. Then, the base station may configure PDCH and DM-RS sequence which the terminal will use in consideration of various factors.

4) a Case of Applying a Clustering Method and a Randomization Method of Selecting PDCH Randomly by Discovery Frame.

Case 4a:
For a special discovery frame, a DM-RS sequence is selected for only PDCHs in the special discovery frame in the same manner with the case 3a. On the contrary, for other discovery frames except the special discover frame, a DM-RS sequence is randomly selected.

Case 4b:
For a special discovery frame, a DM-RS sequence is selected for only PDCHs in the special discovery frame in the same manner with the case 3b. On the contrary, for other discovery frames except the special discover frame, a DM-RS sequence is randomly selected.

Case 4c:
For a special discovery frame, when a PDCH in a transmission duration mapped to the selected cluster is randomly selected, a DM-RS sequence is randomly selected similarly to other discovery frames except the special discovery frame.

Configuration information about methods of selecting PDCH and DM-RS sequence for expanding D2D discovery coverage may be broadcasted in form of system information (SI), or be transferred to terminals via terminal specific dedicated signaling.

[Selection of PDCH and DM-RS Sequence Considering Discovery Range Class]

According to application or other needs, various discovery ranges may be provided for each terminal. For a method of providing various discovery range classes, first, transmission power differentiation may be considered. That is, a terminal desiring broad discovery range may transmit discovery signal with relatively high transmission power, and a terminal desiring small discovery range may transmit discovery signal with relatively low transmission power.

However, discovery range cannot be guaranteed only by controlling transmission power. That is, although a transmission power of a specific terminal is high, if at least one other terminal transmitting signals with the same PDCH as that of the specific terminal exists near from the specific terminal, an actual discovery range of the specific terminal may be reduced. In order to solve the above mentioned problem, it is necessary a method of making terminals using the same PDCH be located apart over a certain distance.

In order to support various discovery range classes, methods of selection PDCH and DM-RS sequence may be enhanced as follows.

A. Dividing discovery resource space for each discovery range class.
  B. In each resource space for each discovery range class, when predefined criteria for guaranteeing discovery range are satisfied, each terminal desiring the discovery range may select PDCH (or, PDCH and DM-RS sequence) having the lowest reception level only in the case that only PDCH(s) having a reception level equal to or below a specific level exists. Or, in the case that PDCH(s) having a reception level equal to or below a specific level does not exist, the terminal may abandon selecting PDCH in the resource space and select PDCH in other resource space. Here, the specific level (threshold value of reception level) may be determined to be inversely proportional to discovery range. Thus, the threshold value should be decreased as desired discovery range increases.
  C. The terminal may select PDCH (or, PDCH and DM-RS sequence) having the lowest reception level, without any specific criteria, in a resource space among a plurality of resource spaces divided for each discovery range class or in a resource space for the smallest discovery range class.
  D. Transmission powers of terminals using resource spaces for the same discovery range class may be configured identically, and transmission powers for different discovery range classes may configured different to each other.
  E. Also, transmission power of each terminal may be different in a resource space for the same discovery range class, so that different detail discovery range classes may be provided in the same resource space. In this case, the threshold value for selecting PDCH (or, PDCH and DM-RS sequence) may be configured by a terminal differently according to transmission power (for example, the threshold value may be configured inversely proportional to the transmission power), and so the terminal may be guaranteed with desired discovery range through the above-mentioned methods.

In the case that the method of selecting PDCH and DM-RS sequence considering discovery range class is applied, a terminal wanting to transmit discovery information may try to select PDCH in a resource space for discovery range desired by itself first, if failed, and then may select PDCH in other discovery range class resource space which it desires. If all the trial fail, the terminal finally may select PDCH in a specific resource space or in a resource space for the smallest discovery range class. In the case of terminals using the above resource space, a specific discovery range may be guaranteed, and average discovery range may be made different according to density of terminals, that is according to how many terminals use the above resource space.

In the case that the above mentioned randomization method of temporal hopping of PDCH by discovery frame is applied, whole resource space may be divided into a plurality of resource spaces for multiple discovery range classes. In the case that the clustering method and the randomization method of temporal hopping of PDCH by discovery frame are applied, a resource space belonging to a cluster may be divided into resource spaces for multiple discovery range classes, or, whole resource space may be divided into fine resource spaces for a plurality of discovery range classes and clustering may be performed in each the fine resource space.

The discovery range class, or, the discovery range class and transmission power selected by the terminal may be reported to a base station implicitly or explicitly when the terminal reports candidate pair(s) of PDCH and DM-RS sequence which the terminal selected.

Configuration information about methods of selecting PDCH and DM-RS sequence considering discovery range class may be broadcasted in form of system information (SI), or be transferred to terminals via terminal specific dedicated signaling.

A Constitution of D2D Discovery Information

Basically, the discovery information may include a discovery terminal identity in the case of restricted type discovery, and may include a service code, a discovery terminal identity and the like in the case of open type discovery.

The following information except the above information may be included in the D2D discovery information according to necessity.

Discovery range class: Information indicating discovery range of transmitting terminal. Information on transmission power level and the like may be applied to this. A terminal which received discovery information may estimate a real path loss between itself and a transmitting terminal by using a level of received signal and the discovery range class.
  Synchronization type: Information indicating which synchronization is acquired by the transmitting terminal. For example, the information may represent one of 'a network synchronization' (means a state that the transmitting terminal is in a cell coverage), 'a GPS synchronization' (means a state that the transmitting terminal is out of a cell coverage and acquired synchronization through receiving GPS signal), 'synchronized with other terminal', and 'an out of synchronization' (means a state that the transmitting terminal is out of a cell coverage and does not acquire the network synchronization or the GPS synchronization).
  Mobility type: Information indicating whether the transmitting terminal is a fixed type terminal or a mobile type terminal.
  WLAN capability, usage channels and the like: Information including a WLAN related capability of the transmitting terminal such as information on supportable specifications by the transmitting terminal—802.11g, 802.11n and so on, and information on WLAN bands/channels to be used. The receiving terminal may request D2D communication based on WIFI-Direct to the transmitting terminal by using the information.
  Physical Cell Identity (PCI) or eNB ID of a serving cell and the like: Information on a cell which the transmitting terminal belongs to. Also, the information may include a Cell-Radio Network Temporary Identifier (C-RNTI) in addition to the information on the cell. These are used for mediation of signaling information between cells performed in a terminal, and at least one bit set by a base station, which indicates whether the meditation is possible or nor, may be included.

According to the method of discover between terminals which was described above, structures of frames and channels for D2D discovery are provided, and methods of constituting and configuring frames for D2D discovery are provided in consideration of various matters. Also, methods of resolving near-far problem caused by differences of distances between terminals in D2D discovery, methods of enlarging discovery coverage, and methods of configuring discovery information are provided.

Thus, more efficient discovery between terminals may be performed and efficiency of resource use can be increased. Also, probabilities of transmitting and receiving discovery information may be enhanced, and so discovery coverage may be enlarged.

While the example embodiments of the present invention and their advantages have been described in detail, it should be understood that various changes, substitutions and alterations may be made herein without departing from the scope of the invention.

What is claimed is:

1. A method of discovery performed in a terminal, comprising:
    receiving configuration information for transmitting discovery information;
    selecting a discovery physical channel through which the discovery information is transmitted in a discovery frame comprising a plurality of transmission durations; and
    transmitting the discovery information through the selected discovery physical channel,
    wherein the configuration information includes information about positions and amount of discovery resources configured according to amount of discovery traffic and information about a structure of a frame, and
    wherein the discovery resources are configured identically for all cells, or are configured with common resources for all cells and cell-specific additional resources for a specific cell.

2. The method of claim 1, wherein the discovery channel is selected in a same transmission duration with other adjacent terminals in a specific discovery frame, and the discovery channel is selected in a transmission duration different from transmission durations selected by other terminals belonging to a same cluster with the terminal in other discovery frames except the specific discovery frame.

3. The method of claim 1, wherein the terminal and other terminal share the discovery physical channel, and the terminal and other terminal use alternately the shared discovery physical channel for each discovery frame.

4. The method of claim 1, wherein the terminal determines a group identity corresponding to the discovery information by using the discovery information which is shared by the terminal and a receiving terminal, selects a resource space corresponding to the group identity, and selects the discovery physical channel in the resource space.

5. The method of claim 1, wherein the discovery information includes at least one a discovery range class, a type of synchronization, information about mobility of the terminal, a capability of wireless area network (WLAN), channels which are used by the terminal, and a physical cell identity of a serving cell.

6. A method of discovery performed in a terminal transmitting discovery information, the method comprising:
    selecting a specific cluster among a plurality of clusters each of which comprises a plurality of terminals;
    selecting a discovery physical channel in a resource space corresponding to the specific cluster; and
    transmitting the discovery information using the selected discovery physical channel,
    wherein the specific cluster is selected based on reception levels of discovery physical channels in each transmission duration of the specific discovery frame and occupation ratios of discovery physical channels in each transmission duration of the specific discovery frame.

7. The method of claim 6, wherein the discovery channel is selected in a same transmission duration with other terminal belonging to the selected cluster in the specific discovery frame.

8. The method of claim 6, further comprising:
    recognizing relative movement of the terminal from terminals belonging to the selected cluster based on reception levels of signals received from the terminals belonging to the selected cluster; and
    selecting again a cluster and a discovery physical channel based on the recognized movement.

* * * * *